US008433207B2

(12) United States Patent
Shin et al.

(10) Patent No.: US 8,433,207 B2
(45) Date of Patent: Apr. 30, 2013

(54) OPTICAL SIGNAL CONCENTRATOR AND OPTICAL RECEIVER USING THE SAME

(75) Inventors: Dong-Jae Shin, Seoul (KR);
Dae-Kwang Jung, Suwon-si (KR);
Jeong-Seok Choi, Yongin-si (KR);
Hong-Seok Shin, Suwon-si (KR);
Kyung-Woo Lee, Yongin-si (KR);
Sung-Bum Park, Suwon-si (KR); Basha Shaik, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 565 days.

(21) Appl. No.: 12/603,021

(22) Filed: Oct. 21, 2009

(65) Prior Publication Data

US 2010/0098439 A1 Apr. 22, 2010

(30) Foreign Application Priority Data

Oct. 21, 2008 (KR) ........................ 10-2008-0103247

(51) Int. Cl.
*H04B 10/06* (2006.01)
*G02F 1/1335* (2006.01)

(52) U.S. Cl.
USPC .............................. 398/212; 398/202; 349/61

(58) Field of Classification Search .................. 398/202; 349/61
See application file for complete search history.

(56) References Cited

U.S. PATENT DOCUMENTS

| 4,936,657 | A | * | 6/1990 | Tejima et al. | 349/7 |
| 5,445,011 | A | * | 8/1995 | Ghislain et al. | 73/105 |
| 5,561,538 | A | * | 10/1996 | Kato et al. | 349/5 |
| 5,797,668 | A | * | 8/1998 | Kojima et al. | 362/618 |
| 5,877,500 | A | * | 3/1999 | Braig et al. | 250/353 |
| 6,075,649 | A | * | 6/2000 | Naito | 359/619 |
| 6,123,431 | A | * | 9/2000 | Teragaki et al. | 362/625 |
| 6,163,351 | A | * | 12/2000 | Nakayama | 349/61 |
| 6,603,520 | B2 | * | 8/2003 | Umemoto et al. | 349/65 |
| 6,781,647 | B2 | * | 8/2004 | Fujieda | 349/61 |
| 6,981,791 | B2 | * | 1/2006 | Higashiyama | 362/600 |
| 7,063,448 | B2 | * | 6/2006 | Kang et al. | 362/558 |
| 7,156,546 | B2 | * | 1/2007 | Higashiyama | 362/561 |
| 7,310,473 | B2 | * | 12/2007 | Kim et al. | 385/147 |
| 7,419,292 | B2 | * | 9/2008 | Onishi | 362/620 |
| 7,689,076 | B1 | * | 3/2010 | Balestra | 385/33 |

(Continued)

OTHER PUBLICATIONS

Vorgelegt Von, Silicon concentrator cells in a two-satge photovoltaic system with a concentration facotr of 300x,Jun. 2005, pp. 6-7.*

(Continued)

*Primary Examiner* — Kenneth N Vanderpuye
*Assistant Examiner* — Amritbir Sandhu
(74) *Attorney, Agent, or Firm* — The Farrell Law Firm, P.C.

(57) ABSTRACT

Disclosed are an optical signal concentrator and an optical receiver for wireless optical communication. The concentrator includes a diffusion sheet and a light guide plate positioned below the diffusion sheet for guiding diffused optical signals perpendicularly to the incident direction the diffused optical signals, the light guide plate being formed with at least one concentric circle pattern facing the diffusion sheet. The receiver includes an optical signal concentrator including a diffusion sheet, a light guide plate positioned below the diffusion sheet for guiding the optical signals perpendicularly to the incident direction the diffused optical signals, one or more optical detectors for detecting light projected to the side of the light guide plate, and a reflection plate for reflecting light incident to the light guide plate.

10 Claims, 6 Drawing Sheets

U.S. PATENT DOCUMENTS

| | | | |
|---|---|---|---|
| 7,756,424 B2* | 7/2010 | Turpin et al. | 398/201 |
| 7,978,274 B2* | 7/2011 | Umezaki et al. | 349/42 |
| 8,081,270 B2* | 12/2011 | Lazarev | 349/62 |
| 8,228,448 B2* | 7/2012 | Shiau et al. | 349/15 |
| 8,305,511 B2* | 11/2012 | Shiau et al. | 349/51 |
| 2004/0094696 A1* | 5/2004 | Ramirez-Iniguez et al. | 250/216 |
| 2004/0105046 A1* | 6/2004 | Taira et al. | 349/61 |
| 2004/0135942 A1* | 7/2004 | Lee et al. | 349/113 |
| 2004/0190915 A1* | 9/2004 | Murray et al. | 398/212 |
| 2005/0175363 A1* | 8/2005 | Kim et al. | 398/212 |
| 2006/0119762 A1* | 6/2006 | Haba | 349/61 |
| 2006/0203517 A1* | 9/2006 | Kang et al. | 362/615 |
| 2006/0221270 A1* | 10/2006 | Ioki et al. | 349/61 |
| 2006/0227259 A1* | 10/2006 | Mi et al. | 349/61 |
| 2006/0250542 A1* | 11/2006 | Liu et al. | 349/61 |
| 2006/0262399 A1* | 11/2006 | Green et al. | 359/487 |
| 2007/0200972 A1* | 8/2007 | Ladouceur et al. | 349/61 |
| 2007/0222914 A1* | 9/2007 | Kotchick et al. | 349/61 |
| 2007/0227582 A1* | 10/2007 | Chen et al. | 136/246 |
| 2008/0102893 A1* | 5/2008 | Shin et al. | 455/557 |
| 2008/0211754 A1* | 9/2008 | Park et al. | 345/87 |
| 2008/0257408 A1* | 10/2008 | Chen et al. | 136/259 |
| 2008/0285305 A1* | 11/2008 | Fujino et al. | 362/612 |
| 2010/0007818 A1* | 1/2010 | Saitoh et al. | 349/61 |
| 2011/0260169 A1* | 10/2011 | Umezaki et al. | 257/59 |
| 2011/0267558 A1* | 11/2011 | Hsu et al. | 349/61 |
| 2012/0200801 A1* | 8/2012 | Wheatley et al. | 349/61 |
| 2012/0268687 A1* | 10/2012 | Kaida | 349/61 |

OTHER PUBLICATIONS

Fresnel technologies optical Materials, 2003.*

Pouyan Djahani, Analysis of Infrared wireless links employing multibeam transmitters and imaging diversity receivers, Dec. 200, IEEE transactions on communications, vol. 48, No. 12, pp. 2077-2088.*

RJ green, recent developments in optical wireless systems, Jan. 2008, IET communication vol. 2, No. 1 pp. 3-10.*

* cited by examiner

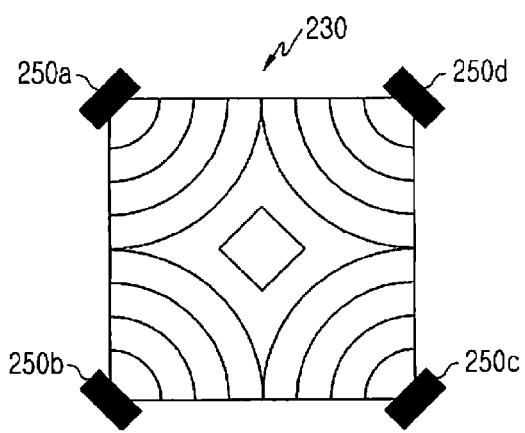 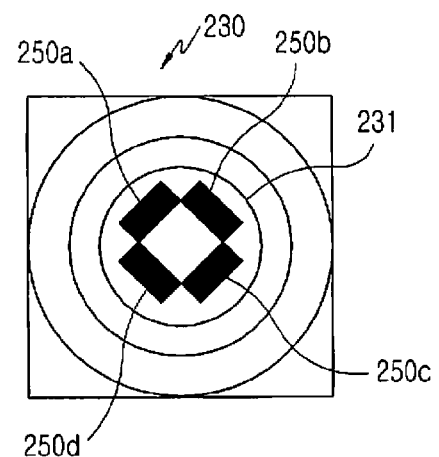
FIG.6A     FIG.6B
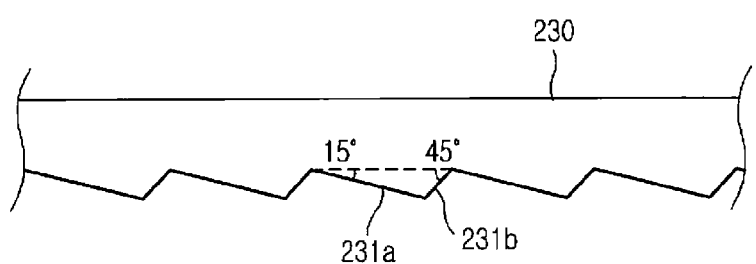
FIG.7

OPTICAL SIGNAL CONCENTRATOR AND OPTICAL RECEIVER USING THE SAME

PRIORITY

This application claims priority under 35 U.S.C. §119(a) to an application entitled "Optical Signal Concentrator And Optical Receiver Using The Same" filed in the Korean Industrial Property Office on Oct. 21, 2008 and assigned Serial No. 10-2008-0103247, the contents of which are incorporated herein by reference.

BACKGROUND OF THE INVENTION

1. Field of the Invention

The present invention relates generally to wireless optical communication, and more particularly to an optical receiver for wireless optical communication.

2. Description of the Related Art

Recently, the luminous efficiency of Light Emitting Diodes (LEDs) has improved while the unit price of LEDs has dropped. Accordingly, LEDs are being used not only in hand-held devices, displays, automobile illuminations, advertising boards, sign boards and the like, but also in fluorescent and incandescent electric lamps. As compared to fluorescent and incandescent lamps, LEDs are capable of emitting light for a substantially longer period of time while using lower electric power.

Interest in optical wireless technology that is complementary with Radio Frequency (RF) technology has increased due to the limitations of RF technology, such as the exhaustion of frequencies in the RF band and the likelihood of crosstalk among wireless communications, the increase of the security requirements for wireless communications, and the advent of the very high speed ubiquitous communication environment of fourth generation mobile communication (4G) wireless technology. As an alternative measure for RF communication technology, various studies and developments are being performed on visible light wireless communications using LEDs.

For portable devices such as mobile phones and Personal Digital Assistants (PDAs), and small household electric products such as digital cameras and Motion Picture Experts Group (MPEG) Layer Audio 3 (MP3) players, extensive research has been performed for peripheral interfaces enabling inter-device communication by providing an Infrared Data Association (IrDA) module-based infrared ray. In addition, products related to such interfaces are now commercially available. Bluetooth® and Zigbee® are examples of such products that do not cause crosstalk among infrared wireless communication devices unlike RF communication, and promote increased communication security and low power of operation.

There has been recent discussion on the use of inter-device wireless communications using LEDs or Laser Diodes (LDs), which are very advantageous in terms of technology and price as compared to IrDA modules. If visible light LEDs or LDs are employed in peripheral interface communication, a user can visually confirm communication paths, which enables visual confirmation of communication security. In addition, since it is easy to align communication paths, the diffusion angle can be minimized, whereby high speed communication or low power designs can be implemented.

In a wireless optical communication including visible light communication, a receiver should have a wide light concentration area and a wide view angle. In particular, if the diffusion angle of light is small in visible light communication, the arrangement of a communication link can be more easily performed as the light concentration area of the receiver is increased. A conventional light concentrator employing an optical lens is formed in a three dimensional shape having a wide light concentration area, but also has an increased volume which compromises the application of such a light concentrator to small hand-held devices.

FIG. 1A illustrates an example in which the light concentration angle of a receiver 120 is narrow while the diffusion angle of a transmitter 110 is wide. In FIG. 1A, there is a limitation in the transmission distance and speed due to the large diffusion angle. If the light concentration angle of the receiver 120 is wide and the diffusion angle of the transmitter 110 is narrow as shown in FIG. 1B, the arrangement can be easily performed and long distance and high speed communication can be obtained.

In order to increase the light concentration efficiency in a narrow diffusion angle as shown in FIG. 1B, a light concentrator as shown in FIGS. 2A and 2B has been proposed. FIG. 2A illustrates a light concentrator, and FIG. 2B illustrates a cross-sectional view of the light concentrator, in which a light incident path of an optical signal is schematically depicted.

Because the light concentrator shown in FIGS. 2A and 2B is three-dimensionally shaped, it exhibits an increased receiving rate within a limited diffusion angle range. Accordingly, it is difficult to apply the light concentrator in FIGS. 2A and 2B to a hand-held device.

SUMMARY OF THE INVENTION

Accordingly, the present invention has been made to solve the above-mentioned problems occurring in the prior art, and the present invention provides an optical receiver for a wireless optical communication system, which has a reduced volume and is easily applied to a hand-held device.

In accordance with the present invention, there is provided an optical signal concentrator including a diffusion sheet for diffusing an optical signal and outputting optical signals, and a light guide plate positioned below the diffusion sheet for guiding the optical signals, which are incident to the light guide plate from the diffusion sheet, perpendicularly to the incident direction of the optical signals, the light guide plate being formed with at least one pattern facing the diffusion sheet and concentrating the optical signals into a predetermined position.

In accordance with the present invention, there is provided an optical receiver for wireless optical communication including an optical signal concentrator including a diffusion sheet for diffusing an optical signal and outputting optical signals, and a light guide plate positioned below the diffusion sheet for guiding the optical signals, which are incident to the light guide plate from the diffusion sheet, perpendicularly to the incident direction of the optical signals, one or more optical detectors positioned on a side of the light guide plate for detecting light projected to the side of the light guide plate, and a reflection plate positioned under the light guide plate for reflecting light incident from the light guide plate to the light guide plate.

BRIEF DESCRIPTION OF THE DRAWINGS

The above and other aspects, features and advantages of the present invention will be more apparent from the following detailed description taken in conjunction with the accompanying drawings, in which:

FIGS. 4A and 4B, 5A and 5B, and 6A and 6B illustrate examples of light guide plates which can be applied to the optical signal concentrator shown in FIG. 3A;

FIG. 7 illustrates a cross-section of the light guide plate shown in FIG. 3A.

DETAILED DESCRIPTION OF THE EMBODIMENTS

Hereinafter, embodiments of the present invention will be described with reference to the accompanying drawings. In the following description, a detailed description of known functions and configurations incorporated herein will be omitted for the sake of clarity and conciseness.

Figure 1A:
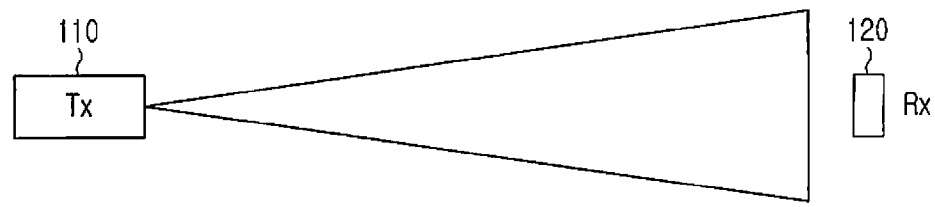
FIGS. 1A and 1B illustrate a conventional optical signal transmitter and a conventional optical signal receiver.
Figure 1B:
Figure 2A:
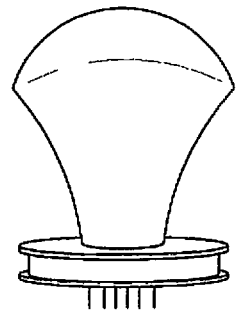
FIGS. 2A and 2B illustrate a conventional optical signal concentrator.
Figure 2B:
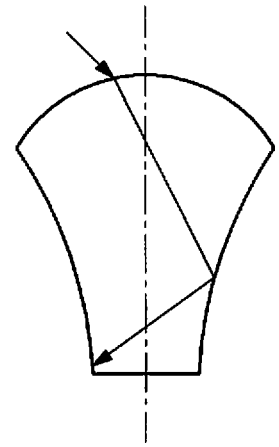
Figure 3A:
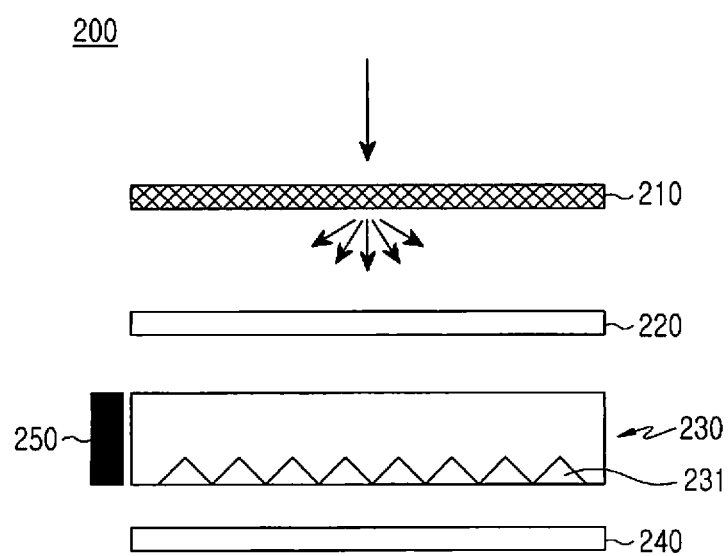
FIGS. 3A and 3B illustrate a cross-section of an optical signal concentrator according to the present invention.

FIG. 3A illustrates an optical signal concentrator according to an embodiment of the present invention. Referring to FIG. 3A, an optical receiver 200 for wireless optical communication includes a light concentrator including a light plate 230, an optical detector 250 positioned on a side of the light guide plate 230 for detecting an optical signal projected toward the side of the light guide plate 230, and a reflection plate 240 positioned under the light guide plate 230 for reflecting an optical signal incident to the light guide plate 230 toward the side of the light guide plate 230.

The light concentrator includes a diffusion sheet 210, the light guide plate 230, and a wide band pass filter 220.

The diffusion sheet 210 diffuses an optical signal (indicated by the arrow toward the diffusion sheet 210) incident from the outside of the optical receiver 200 and projects the diffused optical signals (indicated by the arrows beneath and away from the diffusion sheet 210) toward the light guide plate. It is desired to use a diffusion sheet capable of diffusing an optical signal within a range of ±10 to 30 degrees with reference to a Full Width at Half Maximum (FWHM) of the incident light signal. A transmission diffraction grid or an opaque glass or a hologram optical device may be employed in the diffusion sheet 210.

The light guide plate 230 is positioned under the diffusion sheet 210, and guides an optical signal diffused by the diffusion sheet 210 and incident to the light guide plate in a direction perpendicular to the incident direction of the optical signal, where the incident direction is the direction of the optical signal incident to the interior of the light guide plate 230.

Figure 3B:
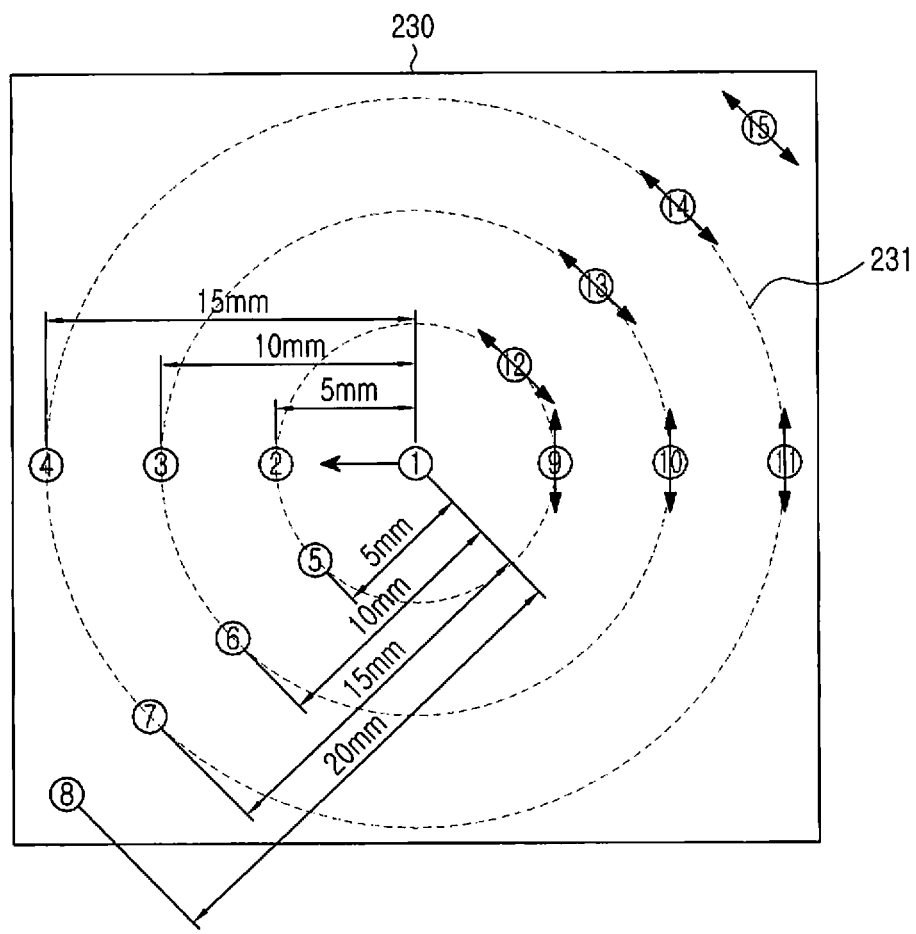

FIG. 3B illustrates a top view of the light guide plate shown in FIG. 3A. Referring to FIG. 3B, the light guide plate 230 is formed with a concentric circle pattern 231 (depicted by dotted lines in FIG. 3B) on either side opposite to the diffusion sheet 210 or the reflection plate 240, wherein the concentric circle pattern 231 is capable of guiding an optical signal incident to its center. That is, the concentric circle pattern 231 is capable of concentrating the optical signal into a predetermined position or area. The light guide plate 230 may have a thickness of 0.5 to 1.5 mm, and may be formed from polycarbonate or Poly (Methyl Methacrylate) (PMMA) with an index of reflection of 1.4 to 1.6.

The optical detector 250 is positioned at the center of the concentric circle pattern 231, so that the optical detector 250 can receive the optical signal collected by the light guide plate 230. That is, because the light guide plate 230 is formed with the concentric circle pattern 210, it can guide the optical signal incident from the diffusion sheet 210 toward the side of the light guide plate (to the center of the concentric circle pattern and hence to the optical detector).

The light guide plate 230 is positioned between the reflection plate 240 and the band pass filter 220, thereby projecting the optical signal incident from the band pass filter 220 to the optical detector 250 positioned opposite to a side of the light guide plate 230. A two-dimensional concentric circle pattern may be formed on the side of the light guide plate 230 opposite to the band pass filter 220 or the other side of the light guide plate 230 opposite to the reflection plate 240 so as to guide the optical signal incident from the band pass filter to the optical detector. The concentric pattern 231 guides the optical signal incident to the interior of the light guide plate 230 to the center of the concentric circle pattern 231.

Each of the circles in the concentric circle pattern has a prism-shaped cross-section with the side opposite to the optical detector being inclined at an angle of 30 to 60 degrees, and the other side being inclined at an angle of 10 to 45 degrees.

Light coupled to the light guide plate 231 is guided by the concentric circle pattern 231 to the center of the concentric circle pattern 231, and the optical detector 250 is positioned at the center of the concentric circle pattern 231.

Figure 4A:
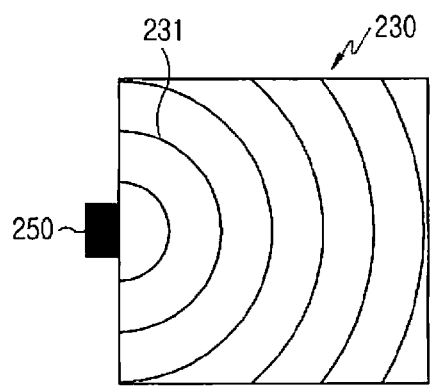

FIGS. 4A to 6B illustrate various examples of light guide plates which can be applied to the optical signal concentrator shown in FIG. 3A. The light guide plates in FIGS. 4A and 4B are formed with only one concentric circle pattern 231, the center of which is oriented to only one direction and is adapted to orient to a side (in FIG. 4A) or a corner (in FIG. 4B) of the light guide plate 230.

Figure 4B:
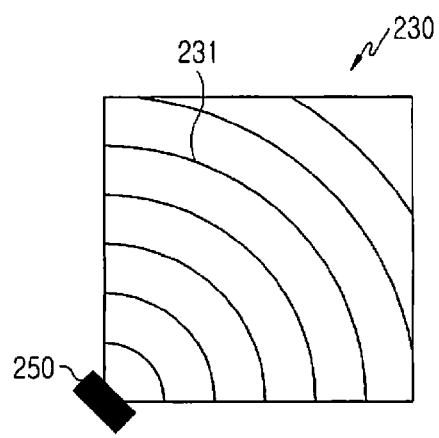
Figure 5A:
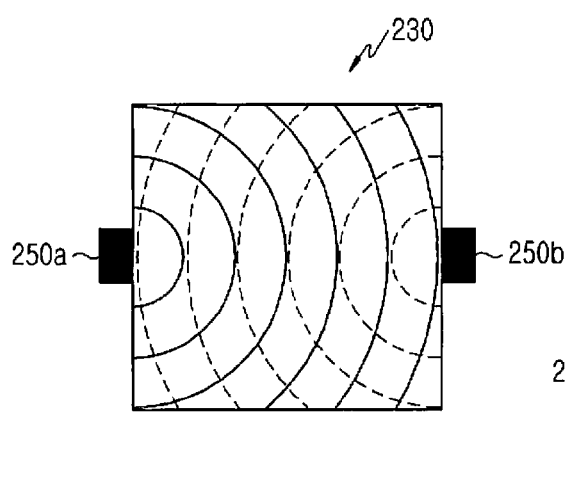
Figure 5B:
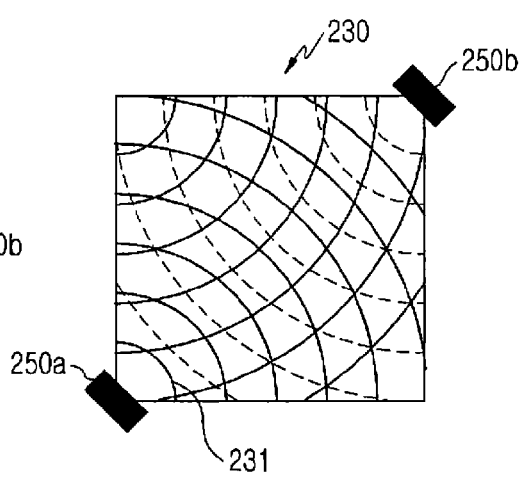

In FIG. 4A, the optical detector 250 is positioned on a side of the light guide plate 230, and in FIG. 4B, the optical detector 250 is positioned at the corner of the light guide plate 230. FIGS. 5A and 5B illustrate examples of light guide plates with two concentric circle patterns (depicted by dotted lines and solid lines in a curvature) which have centers oriented opposite to each other. In FIG. 5A, optical detectors 250a and 250b are oppositely positioned on two opposite sides of the light guide plate 230, and in FIG. 5B, the detectors 250a and 250b are oppositely positioned at two opposite corners of the light guide plate 230. FIG. 6A shows an example of a light guide plate with four (4) concentric circle patterns 231, the centers of which are positioned at the corners of the light guide plate 230, respectively, and FIG. 6b shows an example of a light guide plate with a concentric circular pattern 231, the center of which is positioned at the center of the light guide plate 230. As shown in FIGS. 6A and 6B, optical detectors 250a, 250b, 250c and 250d are also positioned at the centers of the concentric circular patterns 231.

The reflection plate 240 is positioned under the light guide plate 230 opposite to the bottom side of the light guide plate 230, so that the reflection plate 240 returns the light signal emanating from the bottom side of the light guide plate 230 to the light guide plate 230. The reflection plate 240 is spaced a distance from the light guide plate 230. Therefore, an air gap by atmosphere may be formed between the light guide plate and the reflection plate.

FIG. 7 illustrates a cross-section of the light guide plate shown in FIG. 3A. Referring to FIG. 7, each of the circles of the concentric circle pattern 231 formed on the light guide plate 230 has a prism-shaped cross section, wherein each of the prismatic shapes have two faces 231a and 231b which have different inclined angles.

One of the two faces 231a and 231b may have an inclined angle in the range of 30 to 60 degrees, and the other may have an inclined angle in the range of 10 to 45 degrees. Each of the prism-shaped cross sections may be formed in an equilateral triangle with the two differently angled faces 231a and 231b. In addition, each of the prism-shaped cross sections may have a width in the range of 0.1 to 0.5 mm, and the space between two adjacent cross sections may be in the range of 0.1 to 0.5 mm.

The band pass filter 220 is positioned between the diffusion sheet 210 and the light guide plate, so that it interrupts light in an unnecessary frequency band included in the optical signals diffused by the diffusion sheet 210. Such interrupted light includes noise such as spill light with a frequency different from that of a desired optical signal. That is, the band pass filter 220 only passes an optical signal in a desired frequency band to the light guide plate 230. Therefore, the band pass filter 220 minimizes problems caused by light with an unnecessary frequency, wherein the light may be incident to the interior of an optical receiver, thereby disturbing optical signals.

The optical detector(s) 250 may be positioned at the center (s) of the concentric circle pattern(s) on the light guide plate (i.e., on the sides or at the center of the light guide plate), and can detect optical signals guided by the light guide plate 230.

Figure 8:
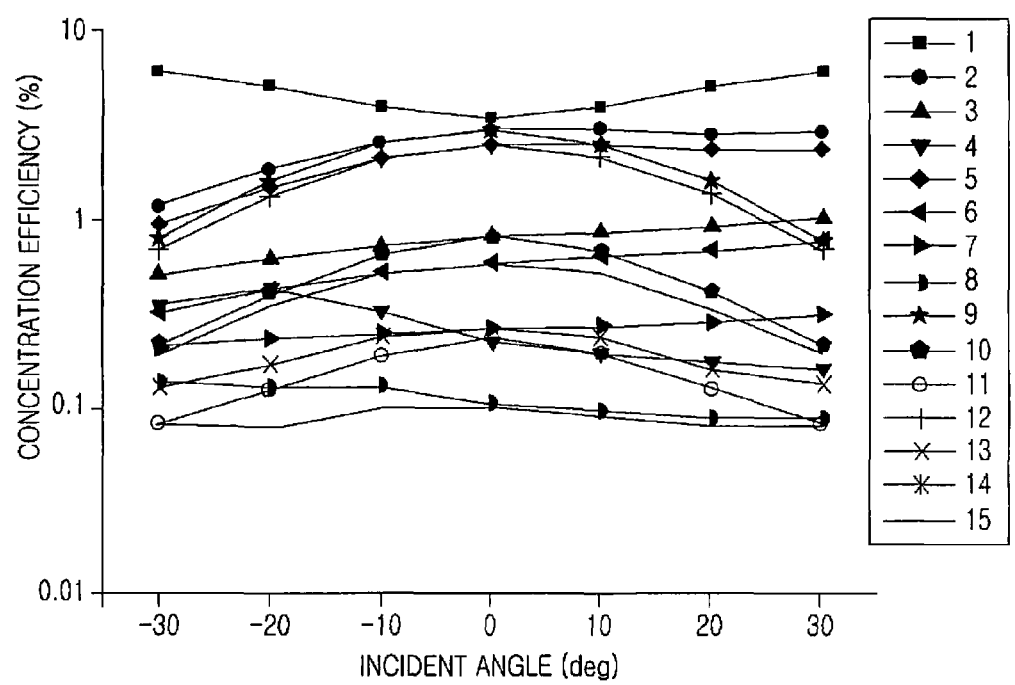
FIG. 8 illustrates the light concentration efficiency of the light concentrator of the present invention.

FIG. 8 illustrates light concentration efficiency of the inventive light concentrator. The graph of FIG. 8 was obtained by using a light guide plate with a size of 30 mm×30 mm, on which concentric circle patterns are formed, and optical detectors with a size of 1 mm×1 mm. Signals used in the experiment have a circle shape with a diameter of about 3 mm.

The concentric circle pattern shown in FIG. 3B has the center positioned at the center of the light guide plate. The graph of FIG. 8 was obtained by measuring the light concentration efficiency of the inventive optical receiver when optical signals are incident to the center ① of the light guide plate, a plurality of points ②, ③ and ④ positioned left with reference to the center ①, a plurality of points ⑨, ⑩ and ⑪ positioned right with reference to the center ①, a plurality of left diagonal points ⑤, ⑥, ⑦ and ⑧, and a plurality of right diagonal points ⑫, ⑬, ⑭ and ⑮.

Each of the respective points is spaced 5 mm away from an adjacent point. In order to measure the change of light concentration efficiency depending on the change of incident angles of optical signals, the light concentration efficiency was measured while changing the incident angles of the optical signals by 10 degrees in the range of −30 to +30 degrees. Some points ①, ②, ③, ④, ⑤, ⑥, ⑦ and ⑧ among the above mentioned points are defined as positive when they are positioned along a direction oriented from the center of the concentric circle pattern toward the circles of the concentric circle pattern. At the other points, the light concentration efficiency was measured when the incident angles of optical signals are changed in a direction perpendicular to the direction the optical signals oriented to the center of the concentric circle pattern (shown by arrows in FIG. 3B).

The graph of FIG. 8 illustrates the change of light concentration efficiency in terms of the incident angle of optical signals at the respective points. Referring to FIG. 8, it can be seen that the light concentration efficiency increases nearer to the center of the concentric circle pattern, and decreases away from the center of the concentric circle pattern, and that the light concentration efficiency is highest when the optical signals are perpendicularly incident to the light guide plate, and decreases as the incident angle increases. The lowest light concentration efficiency is about 0.1%, which is obtained at the points ⑧ and ⑮ which are most remotely spaced from the center of the concentric circle pattern.

Similar to the light concentration efficiency in FIG. 8, Signal to Noise Ratio (SNR) increases nearer to the center of the concentric circle pattern, and decreases away from the center of the concentric circle pattern. In addition, SNR is higher when the optical signals are perpendicularly incident to the light guide plate, and is lower when the incident angle of the optical signals increases.

While the invention has been shown and described with reference to certain embodiments thereof, it will be understood by those skilled in the art that various changes in form and detail may be made therein without departing from the spirit and scope of the invention as defined by the appended claims.

What is claimed is:

1. An optical signal concentrator comprising:
   a diffusion sheet for diffusing an optical signal and outputting diffused optical signals; and
   a light guide plate positioned below the diffusion sheet for guiding the diffused optical signals, which are incident to the light guide plate from the diffusion sheet, in a direction perpendicular to an incident direction of the diffused optical signals on the light guide plate;
   wherein a plurality of concentric circle patterns are formed on a surface of the light guide plate, a central portion of the plurality of concentric circle patterns is positioned on an edge of the light guide plate, and the plurality of concentric circle patterns concentrate the diffused optical signals guided by the light guide plate on one or more optical detectors.

2. An optical receiver for wireless optical communication, comprising:
   an optical signal concentrator including a diffusion sheet for diffusing an optical signal and outputting diffused optical signals, and a light guide plate positioned below the diffusion sheet for guiding the diffused optical signals, which are incident to the light guide plate from the diffusion sheet, in a direction perpendicular to an incident direction of the diffused optical signals on the light guide plate;
   one or more optical detectors positioned on or adjacent to a side of the light guide plate for detecting light projected to the side of the light guide plate; and
   a reflection plate positioned below the light guide plate for reflecting light incident from the light guide plate to the light guide plate;
   wherein a plurality of concentric circle patterns are formed on a surface of the light guide plate, a central portion of the plurality of concentric circle patterns is positioned on an edge of the light guide plate, and the plurality of concentric circle patterns concentrate the diffused optical signals guided by the light guide plate on the one or more optical detectors.

3. The optical receiver as claimed in claim 2, wherein each circle in the plurality of concentric circle patterns has a prism-shaped cross section.

4. The optical receiver as claimed in claim 3, wherein the prism-shaped cross section has two faces facing the one or more optical detectors, one of the faces being inclined at an angle in the range of 30 to 60 degrees, and the other face being inclined at an angle in the range of 10 to 45 degrees.

5. The optical receiver as claimed in claim 4, wherein the cross section has a width in the range of 0.1 to 0.5 mm and cross sections of each circle are spaced from each other with an interval in the range of 0.1 to 0.5 mm.

6. The optical receiver as claimed in claim 2, wherein the diffusion sheet diffuses optical signals incident at an angle in the range of 10 to 30 degrees.

7. The optical receiver as claimed in claim 2, wherein a thickness of the light guide plate is in the range of 0.5 to 1.5 mm.

8. The optical receiver as claimed in claim 7, wherein the light guide plate is formed from polycarbonate or Poly (Methyl Methacrylate) (PMMA) with a refractive index in the range of 1.4 to 1.6.

9. The optical receiver as claimed in claim 2, wherein the reflection plate is spaced from the light guide plate by between 0 mm to 1 mm.

10. The optical receiver as claimed in claim 2, wherein the optical signal concentrator further includes a band pass filter positioned between the diffusion sheet and the light guide plate so as to transmit desired light signals among light signals diffused through the diffusion sheet.

* * * * *